United States Patent
Dyson et al.

(10) Patent No.: US 9,869,201 B2
(45) Date of Patent: Jan. 16, 2018

(54) IMPINGEMENT COOLED SPLINE SEAL

(71) Applicant: GENERAL ELECTRIC COMPANY, Schenectady, NY (US)

(72) Inventors: Thomas Earl Dyson, Niskayuna, NY (US); Victor John Morgan, Simpsonville, SC (US); Neelesh Nandkumar Sarawate, Niskayuna, NY (US); David Benjamin Helmer, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 322 days.

(21) Appl. No.: 14/725,004

(22) Filed: May 29, 2015

(65) Prior Publication Data

US 2016/0348535 A1 Dec. 1, 2016

(51) Int. Cl.
*F01D 9/02* (2006.01)
*F01D 11/00* (2006.01)
*F01D 25/12* (2006.01)

(52) U.S. Cl.
CPC ............ *F01D 25/12* (2013.01); *F01D 11/005* (2013.01); *F05D 2250/14* (2013.01); *F05D 2260/201* (2013.01); *Y02T 50/676* (2013.01)

(58) Field of Classification Search
CPC .......... F01D 9/02; F01D 11/005; F01D 25/12; F05D 2220/32; F05D 2260/201
See application file for complete search history.

(56) References Cited

U.S. PATENT DOCUMENTS

| | | | |
|---|---|---|---|
| 4,752,184 A | 6/1988 | Liang | |
| 5,048,288 A * | 9/1991 | Bessette | F01D 11/24 415/116 |
| 5,092,735 A * | 3/1992 | Katy | F01D 11/08 415/115 |
| 5,823,741 A * | 10/1998 | Predmore | F01D 11/005 415/134 |
| 6,340,285 B1 | 1/2002 | Gonyou et al. | |
| 6,412,270 B1 | 7/2002 | Mortzheim et al. | |
| 6,682,300 B2 * | 1/2004 | Bolms | F01D 11/005 415/139 |
| 6,705,832 B2 * | 3/2004 | Tiemann | F01D 5/22 277/630 |
| 7,217,081 B2 | 5/2007 | Scheurien et al. | |
| 8,303,247 B2 * | 11/2012 | Schlichting | F01D 11/122 29/424 |
| 8,439,629 B2 * | 5/2013 | Pietraszkiewicz | F01D 11/08 415/116 |
| 8,684,680 B2 | 4/2014 | Martin et al. | |
| 2007/0009349 A1 | 1/2007 | Ward, Jr. et al. | |
| 2012/0189435 A1 | 7/2012 | Morgan et al. | |
| 2013/0028713 A1 | 1/2013 | Giri et al. | |
| 2013/0108420 A1 | 5/2013 | Morgan et al. | |
| 2014/0091531 A1 | 4/2014 | Morgan et al. | |

OTHER PUBLICATIONS

U.S. Appl. No. 14/697,765, filed Apr. 28, 2015, Hafner, et al.
E.E. Halila, et al., Title: "High RPessure Trubine Test Hardware Detailed Design Report," NASA, dated Jun. 1982, pp. 1-194.

* cited by examiner

*Primary Examiner* — Igor Kershteyn
(74) *Attorney, Agent, or Firm* — John P. Darling

(57) ABSTRACT

The present application provides a seal for use between adjacent turbine components and with a cooling flow. The seal may include an impingement baffle top plate, a base plate, and one or more spacer elements therebetween. The cooling flow provides cooling through the impingement baffle top plate.

12 Claims, 4 Drawing Sheets

IMPINGEMENT COOLED SPLINE SEAL

TECHNICAL FIELD

The present application and the resultant patent relate generally to gas turbine engines and more particularly relate to gas turbine engines using spline seals and the like with a leakage flow therethrough so as to provide enhanced heat transfer via impingement.

BACKGROUND OF THE INVENTION

Generally described, turbo-machinery such as gas turbine engines and the like include a main gas flow path extending therethrough. Gas leakage, either out of the gas flow path or into the gas flow path, may lower overall efficiency, increase fuel costs, and possibly increase emission levels. Secondary flows may be used within the gas turbine engine to cool the various components heated via the gas flow path. Specifically, cooling air may be extracted from the later stages of the compressor for use in cooling the heated gas flow path components and for purging gaps in cavities between adjacent components. For example, conventional designs may incorporate metallic shims placed in slots between shroud segments so as to minimize any leakage flow therethrough. These gas flow path locations, however, may face very high heat fluxes and/or other operational parameters that may lead to heavy oxidation, creep, and resultant damage or failure.

As firing temperatures increase, the gas flow path temperatures may exceed the material limits of traditional seals so as to cause excessive leakage, loss of efficiency, and an overall reduced component life. There is thus a desire for improved turbine seals and related seal cooling techniques. Such improved turbine seals and techniques thus may accommodate the higher firing temperatures without loss of efficiency or lifetime.

SUMMARY OF THE INVENTION

The present application and the resultant patent thus provide a seal for use between adjacent turbine components and with a cooling flow. The seal may include an impingement baffle top plate, a base plate, and one or more spacer elements therebetween. The cooling flow provides cooling through the impingement baffle top plate.

The present application and the resultant patent further provide a method of cooling a seal positioned between turbine components. The method may include the steps of providing a flow of cooling air to the seal, forcing the flow of cooling air through one or more impingement apertures in the seal, impingement cooling the seal, and forcing the flow of cooling air out of the seal.

The present application and the resultant patent further provide a turbine including a spline seal between adjacent components. The spline seal may include an impingement baffle top plate with one or more impingement apertures therein, a base plate, a first spacer element on a first side of the spline seal, and a second spacer element on a second side of the spline seal. A cooling flow provides cooling through the impingement apertures of the impingement baffle top plate.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
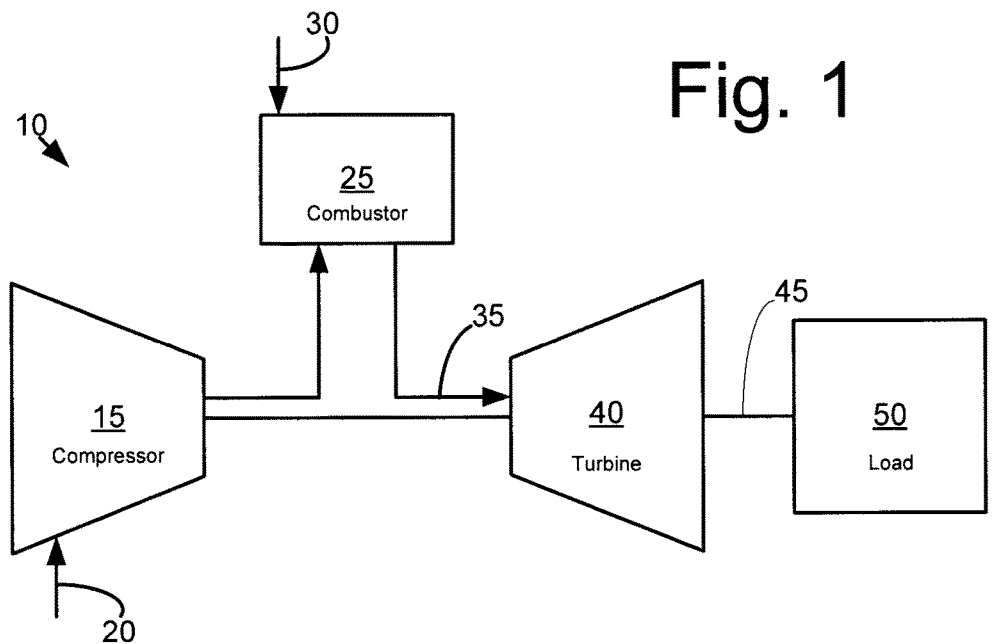
FIG. 1 is a schematic diagram of a gas turbine engine showing a compressor, a combustor, a turbine, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like. Other types of applications include aviation and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
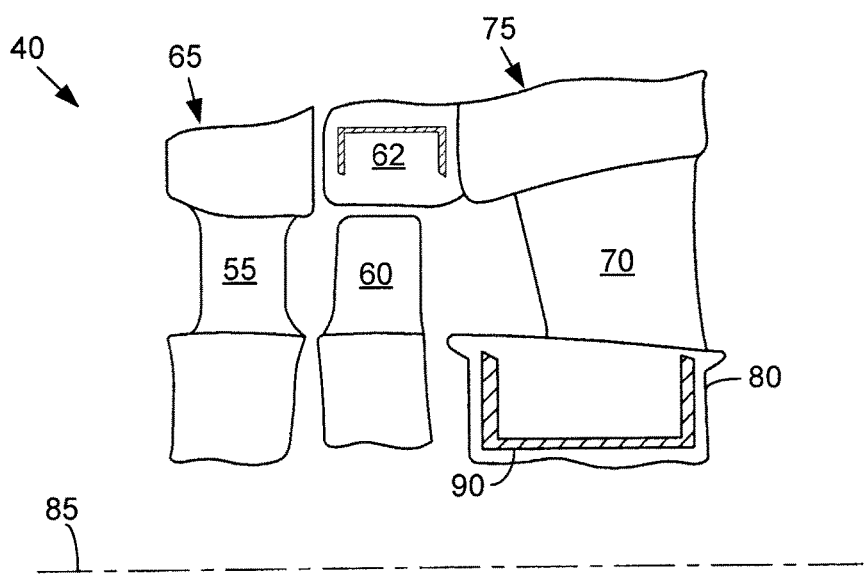
FIG. 2 is a side view of a turbine showing a number of components positioned along a hot gas path.

FIG. 2 shows a portion of the turbine 40. Generally described, the turbine 40 may include a first stage nozzle 55, a first stage bucket 60, and a first stage shroud 62 of a first turbine stage 65. Also shown is a second stage nozzle 70 of a second turbine stage 75. Any number of stages may be used herein. The nozzles 55, 70 may be positioned on a diaphragm 80. Any number of nozzles 70 and diaphragms 80 may be positioned circumferentially about an axis 85. A spline seal 90 may be positioned between each pair of adjacent shrouds 62, adjacent diaphragms 80, and/or other turbine components so as to prevent the leakage therethrough of the cooling air flows 20 from the compressor 15 or elsewhere. As described above, the spline seals 90 may have many different configurations. Other types of sealing mechanisms and techniques also may be used.

Figure 3:
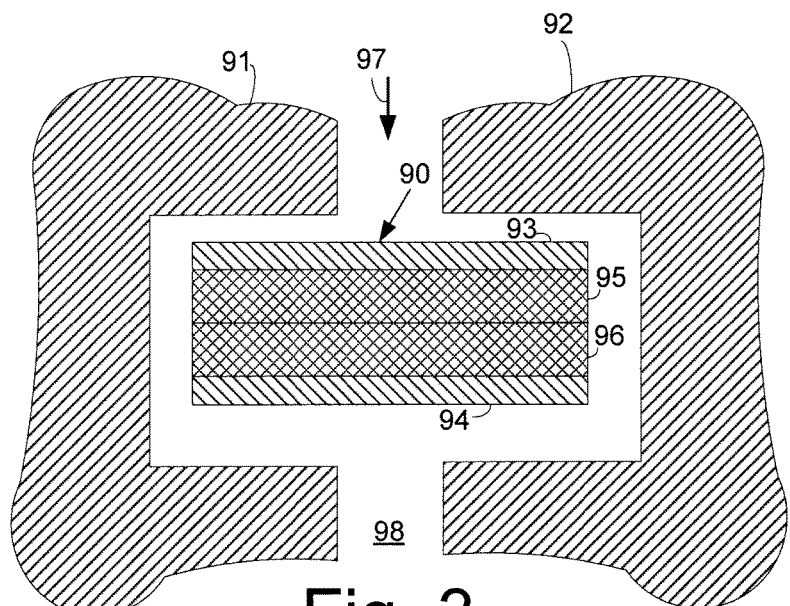
FIG. 3 is a side cross-sectional view of a spline seal positioned between adjacent turbine components.

FIG. 3 shows an example of the spline seal 90 positioned between adjacent turbine components, a first component 91 and a second component 92. The turbine components 91, 92 may be adjacent turbine components such as stator components and the like. The turbine components 91, 92 may define a seal slot 94 therebetween. The spline seal 90 may be a solid material seal although other types of seals such as layered seals may be used. Any number of the spline seals 90 may be used herein. The seals 90 prevent leakage of a flow of high pressure cooling air 97 into a lower pressure hot gas path 98. The seal 90 shown herein is for purpose of example only. Many other seal configurations may be used.

Figure 4:
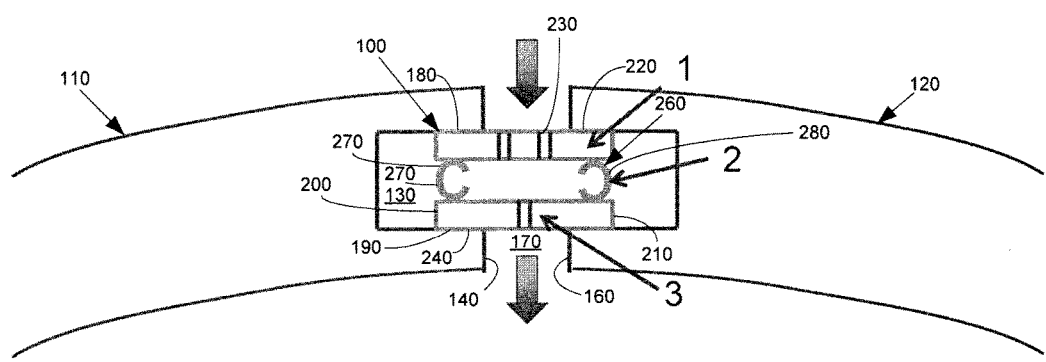
FIG. 4 is a side sectional view of an impingement cooled spline seal as may be described herein.
Figure 5:
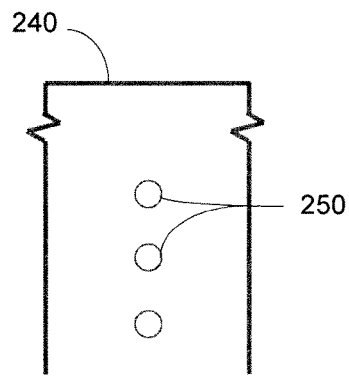
FIG. 5 is a top plan view of a base plate of the impingement cooled spline seal of FIG. 4.

FIGS. 4 and 5 show an example of a spline seal 100 as may be described herein. As described above, the spline seal 100 may be positioned between two adjacent gas turbine components, such as a first gas turbine component 110 and a second gas turbine component 120. Specifically, the spline seal 100 may be positioned between two adjacent slashfaces of the first and second gas turbine components 110, 120 so as to prevent leakage of the cooling flow 97 into the hot gas path 98. The first and second gas turbine components 110, 120 may be shroud components, diaphragms, or other types of gas turbine components. The first gas turbine component 110 may include a first seal slot 130 positioned along a first slash face 140. The second gas turbine component 120 may include a second seal slot 150 positioned along a second slash face 160. The spline seal 100 may be positioned in the first seal slot 130 and the second seal slot 150 so as to form a seal between the first slash face 140 and the second slash face 160. The spline seal 100 thus may block a slash face gap 170 in whole or in part. The spline seal 100 may have a top 180, a bottom 190, a first end 200, and an opposed second end 210. (The terms "bottom," "base," "top," "side," "end," "first," "second," and the like are used for purposes of relative orientation only and not as an absolute position.) The spine seal 100 may be made out of any suitable temperature resistant material.

The spline seal 100 may include an impingement baffle top plate 220. The impingement baffle top plate 220 may include a number of impingement apertures 230 therein. Although two (2) impingement apertures 230 are shown, any number of the impingement apertures 230 may be used herein in any suitable size, shape, or configuration. The impingement apertures 230 and their positioning may be designed to optimize heat transfer with respect to flow rate of the cooling flow 97. Moreover, the seal 100 also may be optimized for gradients, temperature, life, and other types of parameters.

The spline seal 100 may include a base plate 240. The base plate 240 may have any suitable size, shape, or configuration. The base plate 240 may have a number of base plate apertures 250 therein. Although one (1) base plate aperture 250 is shown, any number of the base plate apertures 250 may be used herein in any suitable size, shape, or configuration. The base plate apertures 250 may increase the volume of the cooling flow 97 through the spline seal 100 so as to enhance overall cooling. Alternatively, as shown below, the base plate 240 also may be a solid structure without any of the apertures 250 therein.

Positioned between the impingement baffle top plate 220 and the base plate 240 may be one or more spacer elements 260. In this example, a first spacer element 270 and a second spacer element 280 may be used herein. Any number of the spacer elements 260 may be used herein in any suitable size, shape, or configuration. The spacer elements 260 may be positioned about the first end 200 and the second end 210 so as to provide the spline seal 100 with a box like shape in combination with the impingement baffle top plate 220 and the base plate 240. Other positions and orientations may be used herein. The spacer elements 270, 280 may prevent or limit the loss of the cooling flow 97 out of the ends 200, 210 of the spline seal 100.

The spacer elements 260 may be a spring element 290 and the like. More specifically, the spring elements 290 may be a flat spring and the like. Differing types of spring materials may be used herein. The spacer elements 260 may have a substantial "C" like shape, a "U" like shape, a leaf spring, and other types of suitable shapes. The spring elements 290 may increase the contact force between the turbine components 110, 120 and the spline seal 100. This increased contact may increase the volume of the cooling flow 97 passing through the impingement apertures 230 and also may reduce the overall leakage flow therethrough. Alternatively, the spacer element 260 may be made of a different material as compared to the impingement baffle top plate 220 and the base plate 240 so as to drive the plates 220, 240 apart via a difference in the overall coefficient of thermal expansion. Other components and other configurations may be used herein.

In use, the cooling flow 97 may be forced through the impingement apertures 230 of the impingement baffle top plate 220. The impingement apertures 230 may force the cooling flow 97 into a number of discrete jets that impinge upon the base plate 240 so as to provide enhanced cooling. The spline seal 100 may be combined with other types of seal cooling technologies and techniques so as to allow very high temperature operation. The spline seal 100 thus may provide lower maintenance costs and improved overall efficiency when operational temperatures exceed material limits for conventional shrouds such as metallic shrouds, ceramic matrix composite shrouds, and the like. The spline seal 100 thus uses the overall leakage flow therethrough to improve component life with minimal fluid losses.

Figure 7:
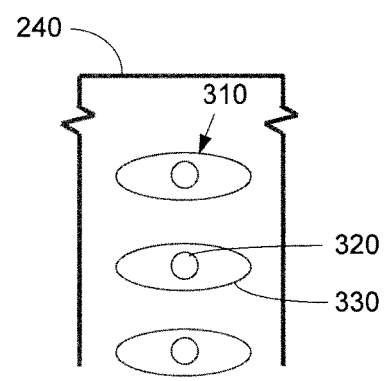
FIG. 7 is a top plan view of a base plate for use with the impingement cooled spline seal of FIG. 6.
Figure 6:
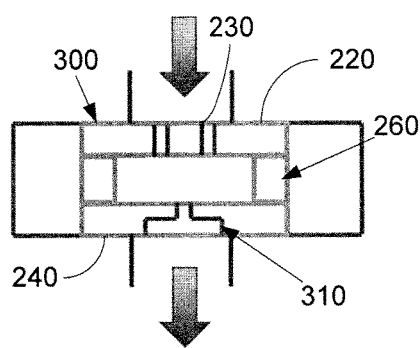
FIG. 6 is a side sectional view of an alternative embodiment of an impingement cooled spline seal as may be described herein.

FIGS. 6 and 7 show an alternative embodiment of a spline seal 300 that may be described herein. The spline seal 300 may be largely similar to the spline seal 100 described above and may include the impingement baffle top plate 220, the base plate 240, and a pair of spacer elements 260. Instead of the base plate 240 including the base plate apertures 250, the base plate 240 herein may include a number of base plate exhaust slots 310. The base plate exhaust slots 310 may include a relatively narrow exit aperture 320 within a substantially concave cavity 330. The base plate exhaust slots 310 may have any suitable size, shape, or configuration. Any number of the base plate exhaust slots 310 may be used herein. Combinations of the base plate apertures 250 and the base plate exhaust slots 310 also may be used herein. Other components and other configurations may be used herein.

Figure 8:
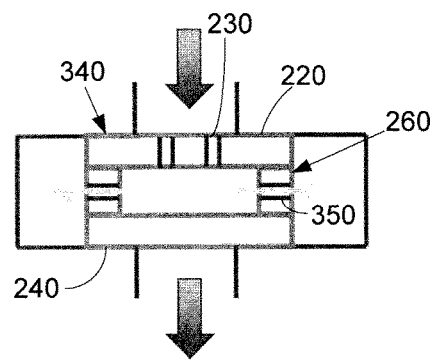
FIG. 8 is a side sectional view of an alternative embodiment of an impingement cooled spline seal as may be described herein.

FIG. 8 shows a further embodiment of a spline seal 340 as may be described herein. The spline seal 340 may be largely similar to the spline seal 100 described above and may include the impingement baffle top plate 220, the spacer elements 260, and the base plate 240. In this example, the base plate 240 may not include the base plate apertures 250. Instead, the base plate 240 may be solid and one or more of the spacer elements 260 may have one or more spacer element apertures 350 positioned therein. Any number of the spacer element apertures 350 may be used herein in any suitable size, shape, or configuration. The cooling flow 97 thus may exit via the spacer element apertures 350. Specifically, the cooling flow 97 may pass into the seal slots 130, 150 via the spacer element apertures 350 and then may leak into the slash-face gap. The spline seal 340 may be any suitable size, shape, or configuration. Other components and other configurations may be used herein.

Figure 9:
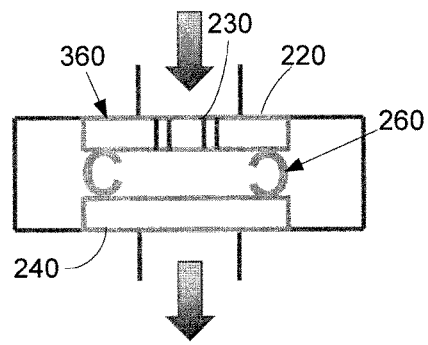
FIG. 9 is a side sectional view of an alternative embodiment of an impingement cooled spline seal as may be described herein.

FIG. 9 shows a further alternative embodiment of a spline seal 360 as may be described herein. The spline seal 360 may be largely similar to the spline seal 100 described above and may include the impingement baffle top plate 220, the base plate 240, and the spacer elements 260. In this example, the base plate 240 may not include the base plate aperture 250. Rather, the base plate 240 may be solid. Similarly, the spacer elements 260 may not include the spacer element apertures 350. Rather, the spacer elements 260 may be solid. Given such, the spline seal 360 does not include any exit apertures at all. Rather, all of the cooling flow 97 may exit via a leakage flow. The spline seal 360 may be any suitable size, shape, or configuration. Other components and other configurations may be used herein.

Figure 10:
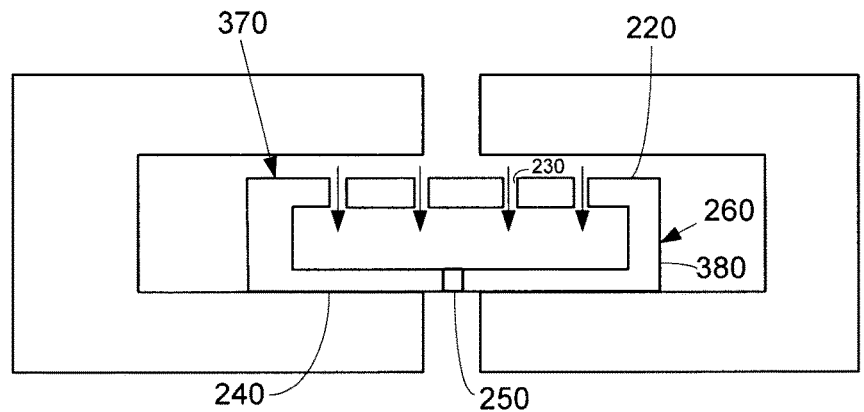
FIG. 10 is a side sectional view of an alternative embodiment of an impingement cooled spline seal as may be described herein.

FIG. 10 shows a further embodiment of a spline seal 370 as may be described herein. The spline seal 370 may be similar to the spline seal 100 described above and may include the impingement baffle top plate 220, the base plate 240, and the spacer elements 260. The impingement baffle top plate 220 may include the impingement apertures 230 and the base plate 240 may include one or more base plate apertures 250. The spacer elements 260, however, may not be made out of the spring element 290. Rather, the spacer elements 260 each may be a solid element 380. As described above, the solid elements 380 may separate the plates 220, 240 via a differing coefficient of the thermal expansion and the like. Different types of materials may be used herein for differing rates of thermal expansion. The spline seal 370 may be any suitable size, shape, or configuration. Other components and other configurations may be used herein.

Figure 11:
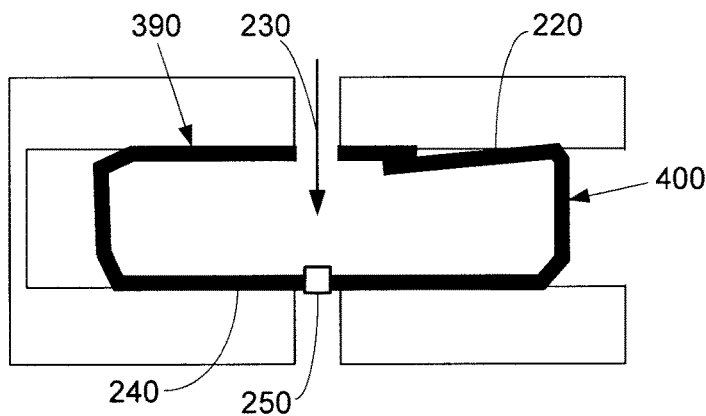
FIG. 11 is a side sectional view of an alternative embodiment of an impingement cooled spline seal as may be described herein.

FIG. 11 shows a further embodiment of a spline seal 390 as may be described herein. The spline seal 390 may be substantially similar to the spline seal 100 described above and may include the impingement baffle top plate 220, the base plate 240, and the spacer elements 260. The impingement baffle top plate 220 may include one or more impingement apertures 230 and the base plate 240 may include one or more base plate apertures 250. In this example, the spacer elements 260 as well as the impingement baffle top plate 220 and the base plate 240 may be a spring clip 400 and the like. Given such, all or part of the spline seal 390 may be made out of a spring-like material. Differing types of spring materials may be used herein. The spline seal 390 may have of any suitable size, shape, or configuration. Other components and other configurations may be used herein.

Figure 12:
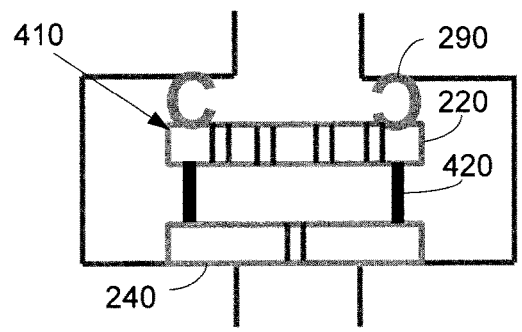
FIG. 12 is a side sectional view of an alternative embodiment of an impingement cooled spline seal as may be described herein.

FIG. 12 shows a further embodiment of a spline seal 410 as may be described herein. The spline seal 410 may be substantially similar to the spline seal 100 described above and may include the impingement baffle top plate 220, the base plate 240, and the spacer elements 260. The impingement baffle top plate 220 may include one or more impingement apertures 230 and the base plate 240 may include one or more base plate apertures 250. In this example, the spacer elements 260 may be substantially rigid walls 420. The substantially rigid walls 420 may be less flexible than, for example, the spring elements 290 the like. The substantially rigid walls 420 may have any suitable size, shape, or configuration. The spline seal 410 instead may have one or more spring elements 290 positioned on top of the impingement baffle top plate 220. The substantially rigid walls 420 thus provide a substantially constant distance between the impingement baffle top plate 220 and the base plate 240 while the spring elements 290 provide high pressure on the impingement baffle top plate 220. This higher pressure may allow for a wide spacing of the impingement apertures 230 so as to provide substantially uniform cooling to the base plate 240. The spline seal 410 may have of any suitable size, shape, or configuration. Other components and other configurations also may be used herein.

The spline seals described herein thus provide a substantially consistent cooling flow rate so as to provide improved cooling and an extended overall seal life. Moreover, the spline seals described herein may provide improved cooling with reduced secondary flows, higher overall engine efficiency, and a reduced heat rate. Different configurations of spline seals may be used herein together. Other types of sealing technology and techniques also may be used herein. The spline seals may be original equipment or part of a retro-fit.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:
1. A turbine comprising:
first and second adjacent turbine components; and
a seal between the first and second adjacent turbine components comprising:
an impingement baffle top plate with one or more impingement apertures therein;
a base plate; and
one or more spacer elements therebetween;
wherein a cooling flow provides cooling to the seal through the impingement apertures of the impingement baffle top plate towards the one or more spacer elements and the base plate and exiting through the one or more spacer elements, the base plate, or a combination of the one or more spacer elements and the base plate.

2. The turbine of claim 1, wherein the base plate comprises one or more base plate apertures, one or more base plate exhaust slots, or a solid structure.

3. The turbine of claim 1, wherein the one or more spacer elements comprise a spring element or a material with a different coefficient of thermal expansion than the impingement baffle top plate and/or the base plate.

4. The turbine of claim 1, wherein the base plate and the one or more spacer elements comprise a solid element.

5. The turbine of claim 1, wherein the impingement baffle top plate, the base plate, and/or the one or more spacer elements comprise a spring material in whole or in part.

6. The turbine of claim 1, wherein the first and second adjacent turbine components define adjacent and facing seal slots.

7. The turbine of claim 6, wherein the seal is positioned in the seal slots of the first and second adjacent turbine components.

8. The turbine of claim 2, wherein the one or more base plate exhaust slots comprise an exit aperture within a cavity.

9. The turbine of claim 1, wherein the one or more spacer elements comprise a first spacer element positioned about a first end of the seal and a second spacer element positioned about a second end of the seal.

10. The turbine of claim 1, wherein the one or more spacer elements comprise a "C" like shape.

11. The turbine of claim 1, wherein the one or more spacer elements comprise one or more spacer element apertures.

12. The turbine of claim 1, wherein the one or more spacer elements comprise a solid element.

\* \* \* \* \*